United States Patent [19]

Scarp

[11] Patent Number: 5,199,963
[45] Date of Patent: Apr. 6, 1993

[54] DUAL FILTERING VACUUM SYSTEM

[76] Inventor: Arcoline J. Scarp, 6205 E. State Rt. 40, Tipp City, Ohio 45371

[21] Appl. No.: 922,508

[22] Filed: Jul. 30, 1992

[51] Int. Cl.$^5$ ............................................. B01D 47/02
[52] U.S. Cl. .................................... 55/186; 55/255; 55/257.3; 55/320; 55/472; 55/DIG. 3
[58] Field of Search .................. 55/185, 186, 245, 248, 55/255, 259, 207.3, 318, 328, 321, 472, 473, DIG. 3

[56] References Cited

U.S. PATENT DOCUMENTS

| | | | |
|---|---|---|---|
| D. 296,945 | 7/1988 | Erickson | D32/23 |
| 2,102,350 | 1/1937 | Brock | 183/24 |
| 2,221,572 | 12/1940 | Brock | 183/25 |
| 2,886,127 | 5/1959 | Brock | 183/37 |
| 2,945,553 | 7/1960 | Brock | 183/24 |
| 3,805,492 | 4/1974 | King | 55/251.3 X |
| 4,640,697 | 2/1987 | Erickson | 55/248 |
| 4,640,698 | 2/1987 | Ohishi et al. | 55/502 |
| 4,824,333 | 4/1989 | Erickson | 417/360 |
| 4,938,787 | 7/1990 | Simuarlein-Errbacher | 55/257.3 X |
| 5,022,115 | 6/1991 | Kasper | 15/353 |

Primary Examiner—Charles Hart
Attorney, Agent, or Firm—Michael Sand Co.

[57] ABSTRACT

A vacuum cleaner treats cleaning air by forcing the air through a liquid bath so as to remove suspended particulates within the air. The cleaner comprises a pan member adapted to contain the fluid bath, a cleaning air inlet, an upper casing supported from and secured to the pan member, and a motor mounted on the upper casing having a cooling air inlet and cooling air exhaust separate from that of the cleaning air. A main baffle shrouds the cleaning air inlet for the containment of the over splash created by induced fluid turbulence created in the liquid bath by the incoming cleaning air. At least two fluid collector rings are mounted between the cleaning air inlet and cleaning air outlet to provide a circuitous path for the cleaning air after it has traveled through the fluid bath to collect liquid particles and moisture in the cleaning air and redirect it back into the liquid bath. A replaceable air filter is located above the fluid collector ring, through which the cleaning air must pass before exiting through the cleaning air outlet and into the environment to remove additional particulate matter.

15 Claims, 6 Drawing Sheets

DUAL FILTERING VACUUM SYSTEM

BACKGROUND OF THE INVENTION

1. Technical Field

The invention relates generally to vacuum cleaners. More particularly, the invention relates to liquid bath vacuum cleaners. Specifically, the invention relates to portable vacuum cleaners designed for treating air by forcing the air through a fluid bath so as to remove the suspended particulates within the air flow and to a dual baffle system which reduces the amount of moisture migrating towards the exhaust.

2. Background Information

Vacuum cleaners of various designs are used in residential and commercial settings for cleaning purposes. These appliances develop suction to create air flow which picks up particulates from the surface being cleaned. These particulates are separated from the air within the vacuum cleaner for later disposal. One type of vacuum cleaner is a canister type which has a relatively stationary canister connected to a movable nozzle or wand by a flexible connecting hose. One design of canister type vacuum cleaner, known as a fluid bath type, directs incoming air and particulates into contact with a fluid bath thereby absorbing the particulate matter. Fluid bath vacuum cleaners have the significant advantage that their primary filtration mechanism employs a readily available commodity, water.

Numerous designs of fluid bath type vacuum cleaners are presently known. Although devices constructed in accordance with these patents perform satisfactorily, designers are constantly seeking to reduce the number and size of particulates that escape the vacuum cleaner and ultimately re-enter the environment. To reduce the particulate size and the number of particulates that escape the scrubbing process in the vacuum cleaner, the existing cleaners have either employed centrifugal force to separate the particulates from the fluid bath, or induced turbulence into the fluid bath. However, in those cleaners that attempt to induce turbulence, the intensity of the turbulence, as well as the length of time in which the turbulence is induced, are significant factors when considering the efficiency of the scrubbing process.

Inducing severe turbulence into the fluid bath causes the water to migrate upwards into a motor, following the direction of suction, which not only allows suspended particulate to re-enter the air, but also significantly reduces the efficiency of the motor itself. The United States Patent to Erickson, U.S. Pat. No. 4,640,697 provides as its main object, the separation of a cleaning air stream from a motor cooling air stream to improve the cooling efficiency of the motor and to prevent its contamination from the cleaning air thereby attempting to eliminate one of the problems discussed hereinabove. This is accomplished by mounting the motor assembly in a lower cavity so that the cleaning air is circulated through a plurality of scallops in a main housing before passing it to the surrounding atmosphere. Conversely, a cooling motor is mounted within a separate housing in a canister wherein the cooling air exits through gaps into an inner cavity and through a plurality of slits into the surrounding atmosphere. In this manner, the cooling air and the cleaning air travel separate paths, thereby allowing the motor's efficiency to remain high. However, such an arrangement does not counteract the increased migration of fluid toward the motor caused by increased turbulence within the fluid bath and as such, more suspended fluid will enter the surrounding environment.

U.S. Pat. No. 5,022,115, to Kasper, covers a vacuum cleaning system consisting of a vacuum canister assembly and a liquid pan mounted on the bottom of the canister for holding the fluid filter. The inlet includes a port on the side and lower surface of the vacuum canister assembly, and a pan has an upper surface which has an opening therein through which a portion of the inlet port extends. In essence, Kasper discloses a pan assembly that allows the pan to be detached and cleaned more easily. However, Kasper does not disclose means to prevent migration of water into the motor after an increased turbulence has been induced in the fluid medium.

U.S. Pat. No. 2,221,572 to Charles Bront et al. provides means to increase the turbulence within the fluid bath by discharging the cleaning air below the normal surface of the fluid bath. However, while this patent provides means to more absolutely scrub the cleaning air, means have not been provided to reduce the amount of moisture which will migrate into the atmosphere in which the unit is being employed due to the increased turbulence.

Other vacuum cleaners utilizing a fluid bath are shown in U.S. Pat. Nos. 2,945,553, 2,102,353, 2,886,127 and 2,221,572.

SUMMARY OF THE INVENTION

Objectives of the invention include providing means to separate the cleaning air from the motor cooling air to improve the cooling efficiency of the vacuum cleaner motor.

Another objective is to reduce the number and size of particulate expelled with the exhausted cleaning air.

Yet another objective of the present invention is to reduce the amount of suspended fluid that is expelled with the exhausted cleaning air.

A further objective is to increase the turbulence induced into the fluid bath thereby increasing the scrubbing action on the air as it travels therethrough.

A still further objective is to provide means to collect the fluid that migrates toward the exhaust and automatically redirect it back to the fluid bath.

Another objective is to provide such a vacuum cleaner which is of a simple construction, which achieves the stated objectives in a simple, effective and inexpensive manner, and which solves problems and satisfies needs existing in the art.

These and other objectives and advantages of the invention are obtained by the vacuum cleaner of the invention, the general nature of which may be stated as including a pan member adapted to contain a fluid bath; a cleaning air inlet formed in the pan member; an upper casing removably mounted on said pan member; motor means mounted on the upper casing for drawing air into the pan through the air inlet, said motor means having a cooling air inlet and outlet, and a cleaning air inlet and outlet; a main baffle mounted within the pan member and shrouding said cleaning air inlet; at least two fluid collector rings mounted within the upper casing to provide a circuitous path for cleaning air to follow when moving from the cleaning air inlet to the cleaning air outlet; and a replaceable annular air filter surrounding the cleaning air inlet through which cleaning air must pass before exiting into the environment.

BRIEF DESCRIPTION OF THE DRAWINGS

A preferred embodiment of the invention illustrative of the best mode in which applicant has contemplated the principles, is set forth in the following description and is shown in the drawings and is particularly and distinctly pointed out and set forth in the appended claims.

Similar numbers refer to similar parts throughout the drawings.

DESCRIPTION OF THE PREFERRED EMBODIMENT

Figure 1:
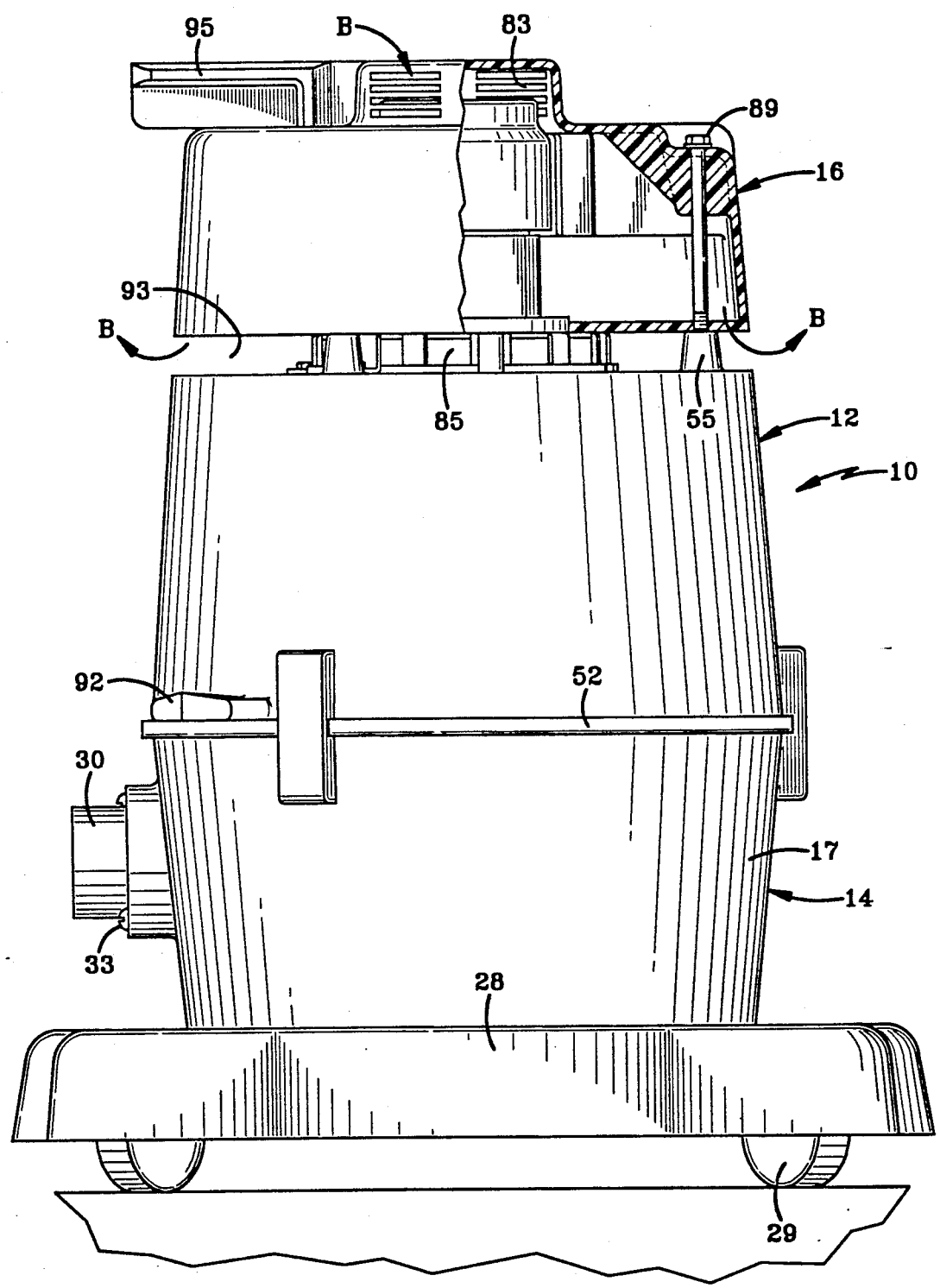
FIG. 1 is a side elevational view of a vacuum cleaner of the present invention with the motor housing shown in cutaway and partial section.
Figure 2:
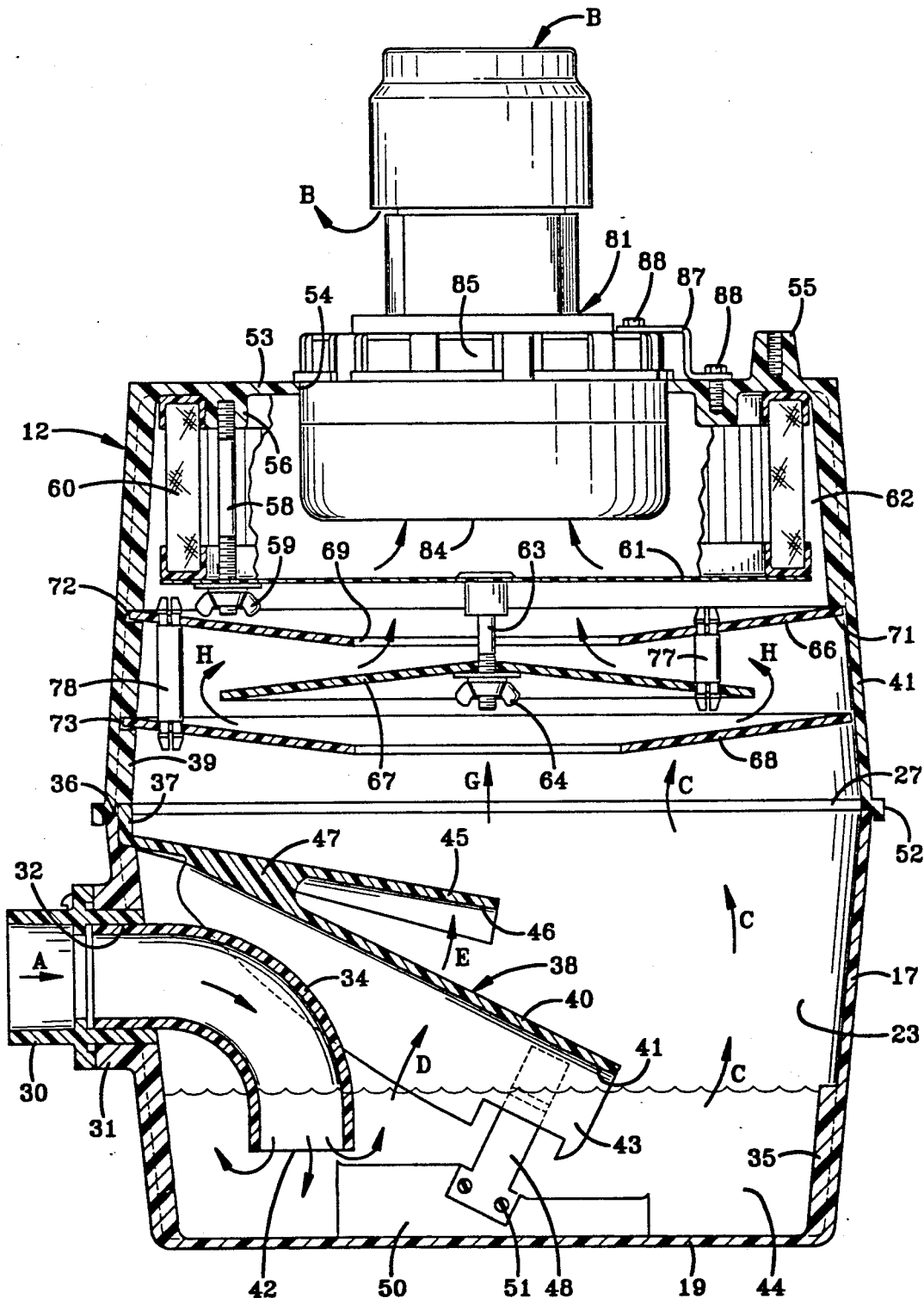
FIG. 2 is a side elevational view of the vacuum cleaner shown in FIG. in partial section, with the supporting dolly and motor cap removed.

Referring to FIGS. 1-2, there is shown a vacuum cleaner of the present invention indicated generally at 10. Cleaner 10 has three joined but detachable portions, a main upper casing 12, a lower pan member 14, and a motor cap 16.

Pan member 14 preferably is molded of a transparent plastic and has a generally inverted frusta-conical or generally cylindrical configuration, with a side wall 17 and an integral base 19 (FIG. 2), which together form a hollow interior or chamber 23, having an open top 27. Pan member 14 is removably supported in a dolly 28 having a plurality of casters 29 for rolling the cleaner along a surface being cleaned. Pan member 14 also includes a socket 30 slidably mounted within an annular boss 31 formed integrally on side wall 17, which forms a cleaning air inlet 32, adapted to accept a coupling portion of a usual flexible cleaning hose (not shown). The remote end of the hose may be connected to any number of known types of nozzle attachments. Socket 30 may be held to the pan member 14 by any convenient means, with screws 33 being depicted in the preferred embodiment (FIG. 1).

The incoming cleaning air depicted by arrows A in FIG. 2 is directed downwardly by a throat member 34, the angle of which may be of any convenient angle, with ninety degrees represented in the preferred embodiment. In any event, the angle embodied in throat member 34 preferably remains smooth so as to assure that the velocity of the cleaning air passing through member 34 is not significantly reduced.

Figure 3:
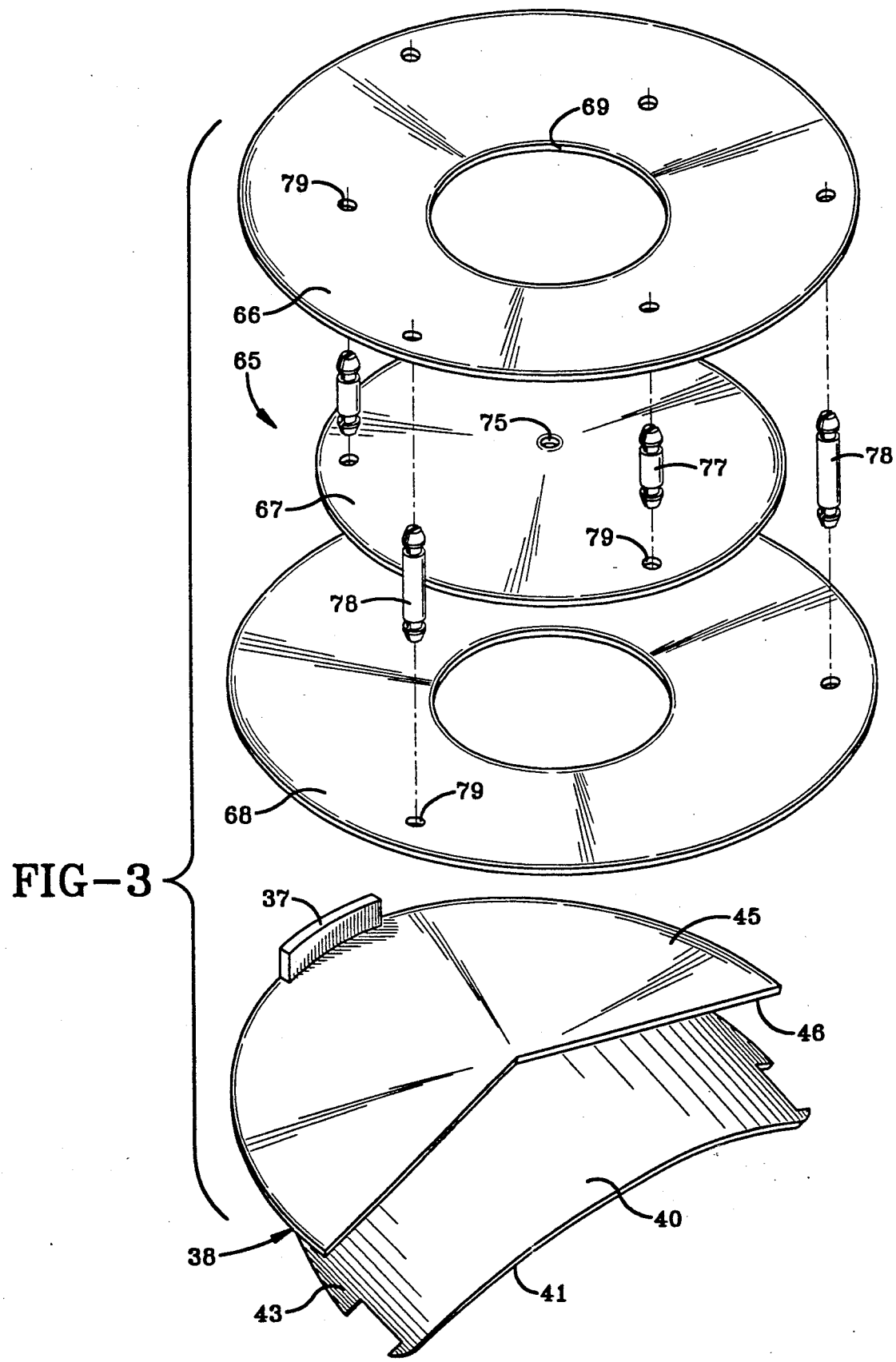
FIG. 3 is an exploded perspective view depicting the orientation of the baffles which shroud the intake port, as well as the spacing of the fluid collector rings.

Extending around the lower inside peripheral of pan member 14 is an annular block portion 35 which terminates at one location above air inlet 32 (FIG. 2) at an arcuate shoulder 36. Shoulder 36 acts as a stop against which an arcuate mounting tang 37 of a baffle assembly 38 is abutted and clamped in position by a lower edge of a second upper annular block 39 which is formed integral with and extends downward along the inside surface of a frusta-conical shaped wall 41 of casing 12. Baffle assembly 38 includes a lower primary or main baffle 40 (FIGS. 2-4) which is a curved member having a concave surface 41 facing downward shrouding cleaning air inlet aperture 32 and open end 42 of throat member 34. Moreover, at least end portions 43 of primary baffle 40 extend below a fluid bath 44 carried within pan member 14.

Baffle assembly 38 has a secondary baffle 45 which is smaller than primary baffle 40, and which extends outwardly above the primary baffle. Baffle 45 has a shape similar to that of primary baffle 40 with a concave surface 46 thereof facing downward toward fluid bath 44. Both baffles 40 and 45 are integrally molded and join in a baffle base 47 out of which extends mounting tang 37.

Figure 4:
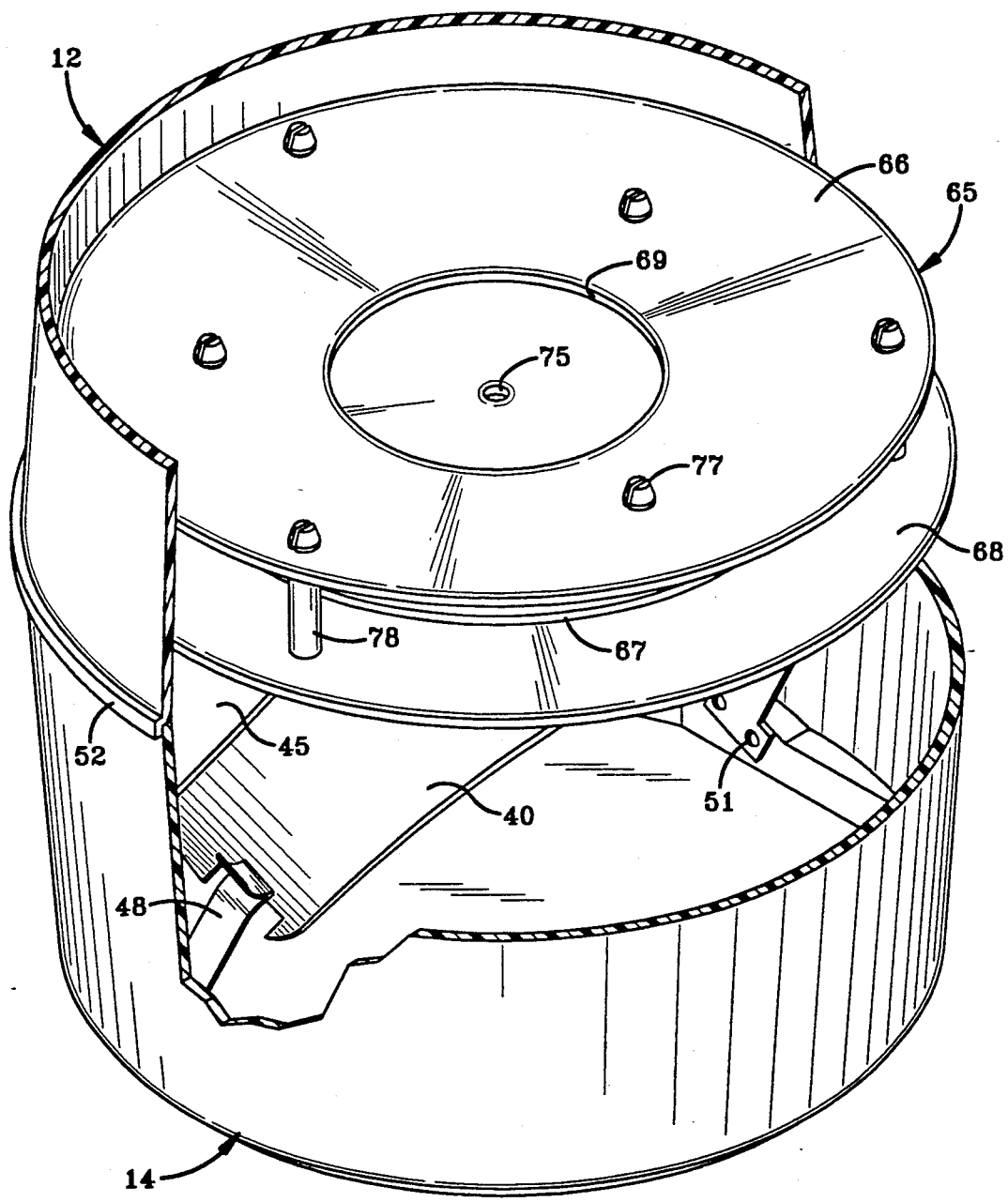
FIG. 4 is a perspective view in cutaway showing the fluid collector rings and baffles of FIG. 3 in assembled position.
Figure 5:
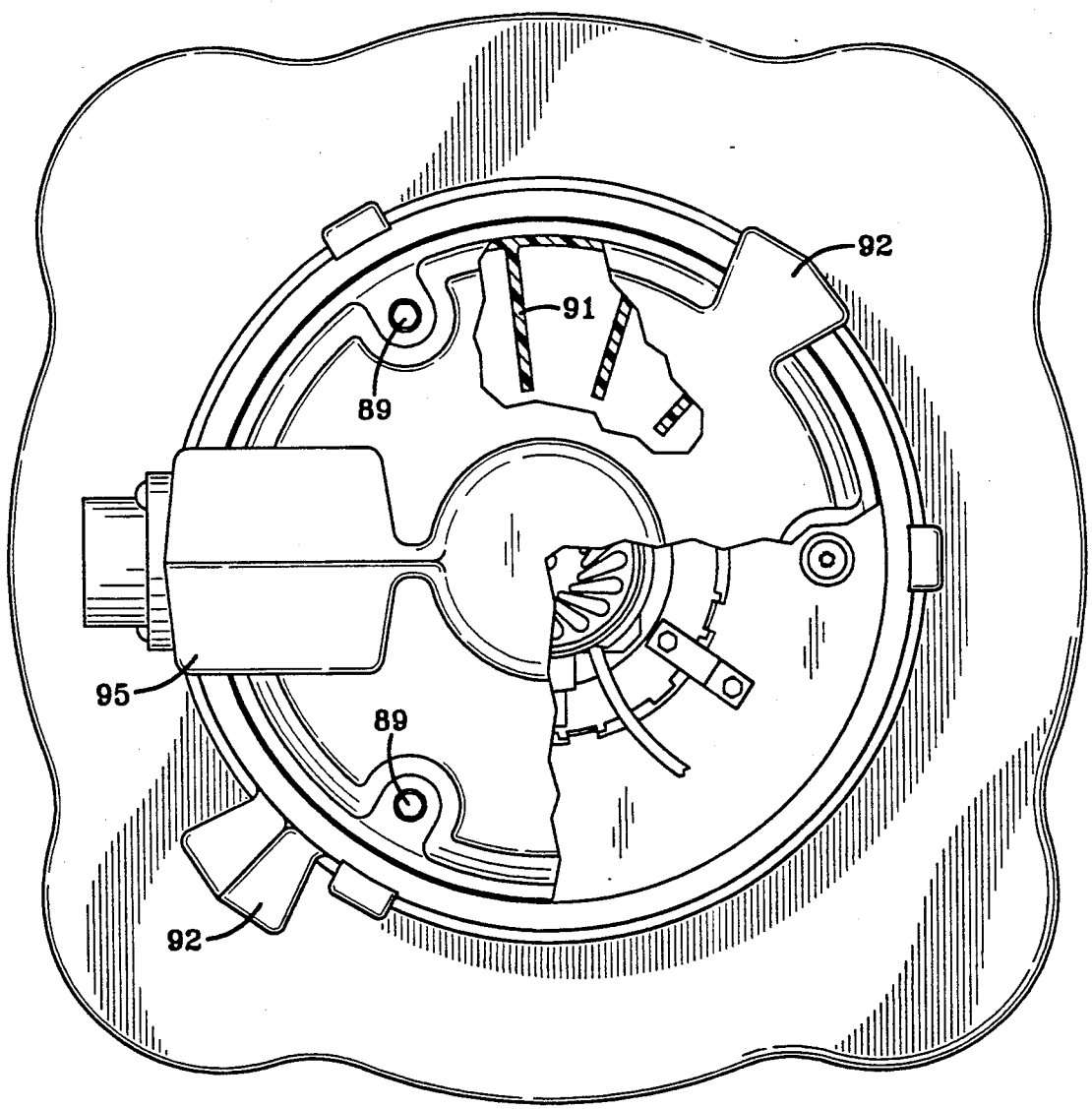
FIG. 5 is a top plan view of the vacuum cleaner shown in partial cutaway with exposed portions shown partially in section and partially in elevation.

The extended end of baffle assembly 38, opposite of mounting tang 37, is retained by any convenient retaining means within hollow interior 23 of pan member 14, with a pair of frictional clips 48 being depicted in the preferred embodiment. Clips 48 are attached to pan member 14 by mounting blocks 50 via screws 51, thereby precluding movement of baffle assembly 38 in a vertical direction within pan member 14. Horizontal movement of baffle assembly 38 is precluded by the sliding fit of the baffle assembly with the interior surface of pan wall 17 as shown in FIG. 4.

Top casing 12 preferably is molded of a high strength plastic material as is pan member 14, and includes generally frusta-conical shaped side wall 41 which terminates in a bottom periphery locking flange 52 which extends outwardly from a lower edge of casing 12. The upper end of casing side wall 41 terminates in an inwardly extending flange 53, formed with a circular central opening 54. Protruding upwardly from an upper surface of flange 53 are three annular bosses 55, formed with an interior threaded cavity. Extending from an inner surface of flange 53 are three annular bosses 56, only one of which is shown in FIG. 2, whose inner cavity also is threaded.

Each boss 56 has an annular cross section with the cavity therein being adapted to accept one end of a mounting rod 58 having a lower threaded end for accepting a wing nut 59. An annular filter 60 is clamped against the inner surface of top flange 53 by a holdup plate 61 (FIG. 2) by a plurality of threaded rods 58. The upper inner circumference of filter 60 abuts bosses 56 firmly securing it in position in top casing 12. The composition of filter 60 may be varied depending on the size of the particulate that must be removed from the cleaning air which passes through the filter. For extremely fine particles, a HEPA filter may be employed. In any event, the type of filter does not affect the spirit of the present invention. As shown in FIG. 2, holdup plate 61 does not contact the inner surface of annular block 39 of main casing wall 41, and forms a circumferential space 62 between wall 41 and holdup plate 61. Extending through a center hole formed in holdup plate 61, is a broad head bolt 63 onto which a wing nut 64 is threaded for mounting a fluid collecting ring assembly indicated generally at 65 within casing 12.

In accordance with another of the main features of the invention (FIGS. 2-4), fluid collecting ring assembly 65 consists of an annular conical upper fluid collecting ring 66, a second or intermediate conical fluid collecting ring 67, and a third or lower conical collecting ring 68. Bolt 63 extends through a central aperture 69 formed in fluid collecting ring 66 but does not directly support ring 66 from bolt 63, as aperture 69 is significantly wider than bolt 63 so that air may travel freely therethrough. A concave bottom surface of fluid collecting ring 66 is oriented upwards away from fluid bath 44, with a peripheral portion abutting shoulder 71 of block 39, with the remainder of the periphery being accepted into an arcuate slot 72 formed in block 39. In this manner, a generally fluid tight seal is created between the edge of fluid collection ring 66 and block portion 39. Block portion 39 is formed with a second arcuate slot 73 which accepts an edge of lower fluid collector ring 68. Inasmuch as slot 73 extends around only a portion of the circumference of the block 39, the edge of ring 68 will achieve a sliding fit with the interior surface of main casing wall 41 at all points circumferentially where slot 73 is not present.

Collecting ring 67 has a smaller diameter than fluid collecting ring 66 and is disposed beneath fluid collecting ring 66 and has a concave surface oriented toward fluid bath 44. Bolt 63 passes through an aperture 75 (FIGS. 2-3) formed in ring 67 through which bolt 63 passes. Collecting ring 68 also is provided with a concave surface oriented upwards away from fluid bath 44.

Collecting ring assembly 65 is support on holdup plate 61 via the interaction of bolt 63 with second middle ring 67. A plurality of clip spacers 77 and 78 are then employed to hold upper and lower rings 66 and 68 to middle collecting ring 67 and to upper ring 66, respectively. The spacers are all accepted into mounting apertures 79 formed in the fluid collecting rings. As wing nut 64 is threaded on bolt 63, the edge of fluid collector ring 66 will be forced into slot 72, and will abut shoulder 71 thereby providing a seal around the periphery of the ring 66. The threadable engagement of the wing nut 64 and bolt 63 will also cause a portion of the periphery of fluid collecting ring 68 to enter second slot 73 along a portion of its periphery. In that portion of the circumference where no such slot is provided, the edge of fluid collection ring 68 will contact the main casing 12 in a sliding fit. If desired, spacers 77 and 78 may be molded integrally with one of the rings and snap fitted into a socket molded into the other ring.

Referring to FIG. 4, there is shown baffle assembly 38 and collecting ring assembly 65 mounted within pan member 14 and upper casing 12. It has been found in practice that such a combination of fluid collection ring assembly 65, baffle assembly 38 and filter 60 prevents nearly all the moisture and particulates contained in the cleaning air from entering the atmosphere after passing through exhaust ports 85 of a motor 81.

Motor 81 according to the present invention, is a two stage bypass motor. Such a motor allows the air that cools the motor, which is shown by arrows B in FIG. 1, to remain separate from the cleaning air which is employed in the cleaning process. One type of motor found suitable is distributed by Lamb Electric Division of Ametek of Kent, Ohio identified as Model 116758-13. Referring then to FIGS. 1, 2, 6 and 7, after the cooling air (arrows B) has been used to extract heat from the motor after entering cooling air inlets 83 formed in motor cap 16, it is expelled outward through cooling air outlets from beneath motor cap 16. The cleaning air after passing through air filter 60 enters motor 81 through a bottom opening 84 and is discharged through cleaning air outlets 85 into the surrounding atmosphere.

Motor 81 is secured to the upper casing 12 via a plurality of tie down brackets 87 which are connected to the casing 12 by bolts 88. The cleaning air intake or bottom portion of motor 81 fits concentrically within the inner diameter of filter 60 such that as the air exits the filter, it passes through motor 81 and out of discharge outlets 85. Motor cap 16 is secured to upper casing 12 via a plurality of bolts 89 threaded into bosses 55 and protects the motor from damage and debris. Cap 16 has a plurality of internal reinforcing ribs 91 molded integrally thereon to strengthen the cap.

Figure 6:
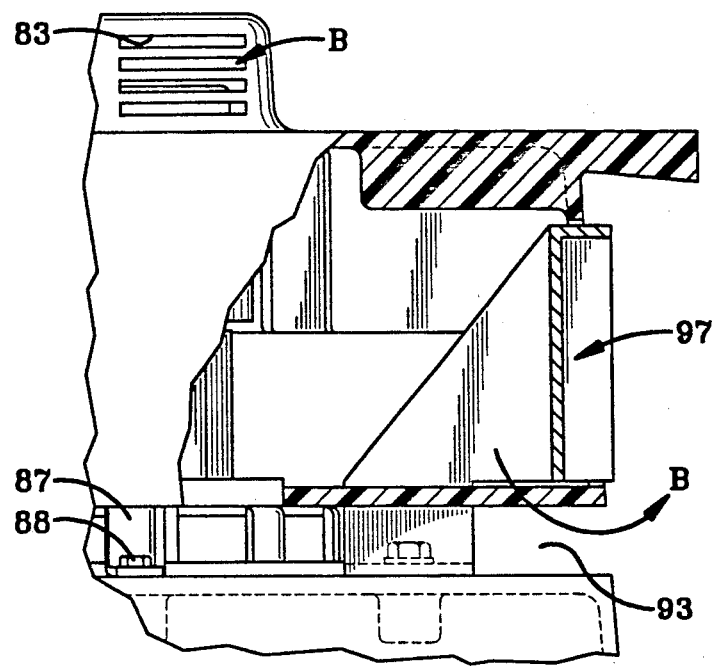
FIG. 6 is a fragmentary view with portions broken away and in section, of the motor and cover cap.
Figure 7:
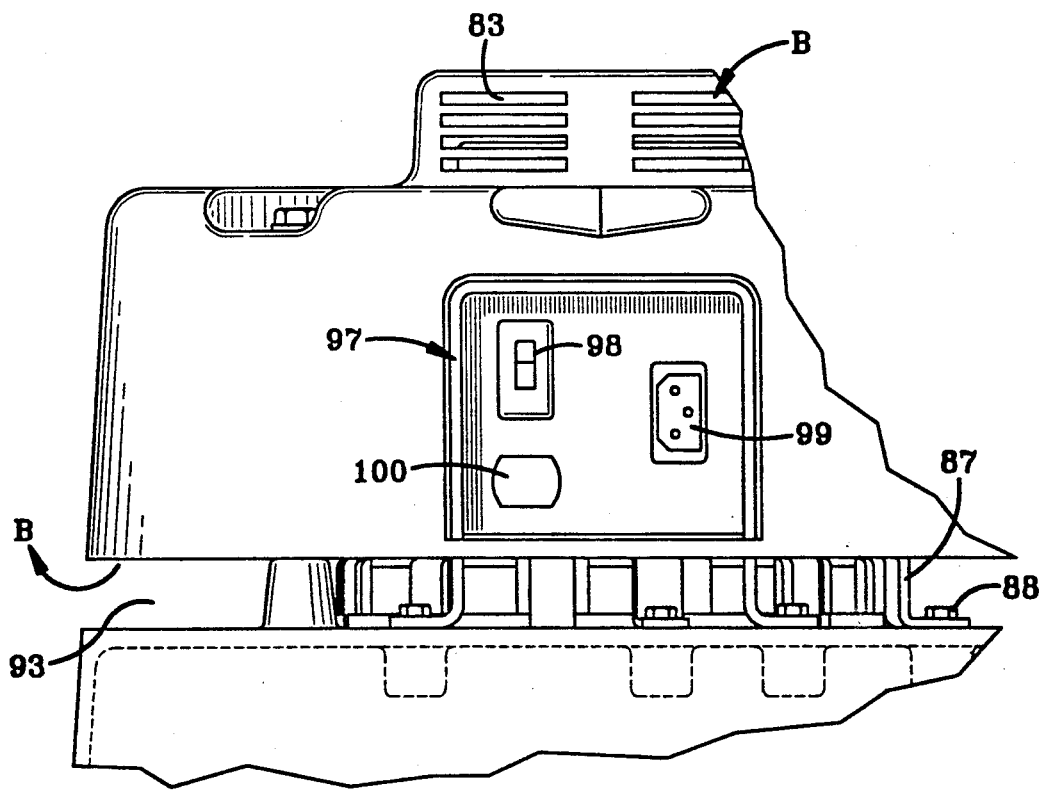
FIG. 7 is a fragmentary side elevational view showing the electrical junction box and switch.

Referring to FIGS. 1, 6 and 7, a plurality of cord retaining tabs 92 are molded integrally on cap 16 and extend outwardly therefrom. An electric power cord (not shown), may be wrapped around tabs 92 and into space 93 formed between the bottom of cap 16 and the top of casing 12 when the cleaner 10 is in storage. A handle 95 (FIG. 1) is molded integrally on cap 16 and is located directly above socket 30 of cleaning air inlet 32. The location of the handle prevents spillage of cleaning fluid from fluid bath. Specifically, when the flexible hose is disconnected, and the user lifts the cleaner 10 by handle 95, the cleaner 10 will be rotated upwards such that the socket 30 will be facing upward preventing the spillage of cleaning fluid from fluid bath 44.

An electrical switch box 97 (FIG. 7) is mounted on motor cap 16 and ON/OFF switch 98, a power input receptacle 99 for power operated nozzle cleaning accessories, and a strain relief 100 for the power supply cord for motor 81.

The operation of vacuum cleaner 10 is best illustrated by referring to FIG. 2. The cleaning air will enter the cleaning unit via a flexible hose attached to socket 30 in the side of pan member 14, and will travel through throat member 34 and exit beneath the surface of fluid bath 44 which usually will be water that may contain a cleaning agent, deodorizer, air freshener or the like. Thereafter, the turbulence induced in the water by the introduction of the cleaning air, will cause the air molecules to be thoroughly scrubbed thereby removing the particulates suspended therein. The air, after leaving the fluid bath, will exit along the path defined by arrow C, with much of the air travelling along path D being blocked by the primary baffle 40.

In accordance with the present invention, the moisture in the air will contact the under surface of baffle 40, causing water to collect on the surface thereof. Since the surface is inclined, the fluid will flow by gravity and be redirected into fluid bath 44. The air that travels around main baffle 40 along the path indicated by arrow E, will rise upward and a portion of this air, again due to turbulence, will contact secondary baffle 45 allowing the liquid suspended within the air to be redirected back into fluid bath 44 in much the same manner.

The remaining air, still carrying with it a certain percentage of moisture, will then travel upward into the upper casing 12. Upon entering casing 12, the only avenue through which the air may travel is through the central aperture in fluid collection ring 68. This path is shown as arrow G in FIG. 2. Inasmuch as the air travelling along path C and G will strike the bottom of ring 68 or the bottom of ring 67, other portions of water which remain suspended in the cleaning air will further collect on these rings. As the surfaces of rings 67 and 68 slope downward, the fluid will travel to the central aperture of fluid collection ring 68 and be directed back into fluid bath 44. The cleaning air after striking fluid collection ring 67, will travel around the periphery of the ring and will continue along path H through central aperture 69 of fluid collection ring 66. Thus, the fluid still entrained in the cleaning air travelling along path H will be further collected upon the bottom surface of ring 66 and upon the top surface of fluid collection ring 67. Again, inasmuch as these rings all provide surfaces which direct the fluid downward, the remaining entrained fluid will ultimately be directed into fluid bath 44 thereby significantly reducing the amount of fluid remaining in the air as it enters the surrounding environment.

Upon leaving fluid collection ring assembly 65, the air then passes through filter 60. Holdup ring 61 prohibits any air from entering the motor unless it first travels through filter 60. As the air travels through filter 60 nearly all remaining fluid and particulates are removed, before it enters the cleaning air intake 84 of motor 81 and be directed into the environment through outlets 85. As such, the cleaning air ultimately exhausted from vacuum cleaner unit 10, has entrained in it very few particulates, as well as very little humidity. Moreover, according to the present invention, the implementation of a detachable filter, and a three stage fluid collection ring assembly, in combination with a two stage bypass motor, increases the efficiency of this unit over the prior art.

Accordingly, the vacuum cleaner of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features and principles of the invention, the manner in which the improved vacuum cleaner is constructed and used, the characteristics of the construction, and the advantages, new and useful results obtained; and new and useful structures, devices, elements, arrangements, parts and combinations, are set forth in the appended claims.

I claim:

1. A vacuum cleaner comprising:
   (a) a pan member adapted to contain a fluid bath;
   (b) a cleaning air inlet formed in the pan member;
   (c) an upper casing removably mounted on said pan member;
   (d) motor means mounted on the upper casing for drawing air into the pan through the air inlet, said motor means having a cooling air inlet and outlet, and a cleaning air inlet and outlet;
   (e) a main baffle mounted within the pan member and shrouding said cleaning air inlet;
   (f) at least two fluid collector rings mounted within the upper casing to provide a circuitous path for cleaning air to follow when moving from the cleaning air inlet to the cleaning air outlet; and
   (g) a replaceable annular air filter surrounding the cleaning air outlet through which cleaning air must pass before exiting into the environment.

2. A vacuum cleaner as defined in claim 1 in which the cleaning air inlet discharges the cleaning air beneath the normal level at which the fluid bath rests thereby inducing turbulence into said fluid bath.

3. A vacuum cleaner as defined in claim 1 in which the motor means is a two stage bypass motor thereby allowing the cooling air to cool said motor and remain separate from the cleaning air.

4. A vacuum cleaner as defined in claim 1 in which the main baffle is adapted to extend into a fluid bath when contained in the pan member.

5. A vacuum cleaner as defined in claim 4 in which a supplemental baffle extends outwardly from a base of the main baffle.

6. A vacuum cleaner as defined in claim 5 in which the main and the supplemental baffles each have a substantially conical shape with a concave surface thereof facing toward a fluid bath.

7. A vacuum cleaner as defined in claim 6 in which the main and the supplemental baffles are integrally formed as a single unit.

8. A vacuum cleaner as defined in claim 1 in which the fluid collector rings are spaced vertically apart.

9. A vacuum cleaner as defined in claim 8 in which there are three fluid collector rings, a bottom, top and middle ring, each having an annular configuration; and in which the middle ring is circular and has a space interposed between a periphery of said middle ring and the upper casing surrounding said middle ring.

10. A vacuum cleaner as defined in claim 9 in which the top and the bottom annular fluid collection rings have a frusta-conical shape with a convex surface facing the fluid bath; and in which the middle ring has a conical shape with a concave surface facing said fluid bath.

11. A vacuum cleaner as defined in claim 1 in which the motor means is positioned on top of the vacuum cleaner.

12. A vacuum cleaner as defined in claim 1 in which the fluid collector rings are disposed vertically between said main baffle and the annular filter.

13. A vacuum cleaner as defined in claim 1 in which the filter means is a HEPA filter.

14. A vacuum cleaner as defined in claim 1 in which a handle is provided on the upper casing and is positioned above the cleaning air inlet such that when the cleaner is picked up by the handle, the cleaning air inlet rotates upward to prevent spillage of the fluid bath from within the pan member.

15. A vacuum cleaner comprising:
   (a) a pan member adapted to contain a fluid bath;
   (b) a cleaning air inlet which discharges cleaning air beneath the normal level at which said fluid bath rests;
   (c) an upper casing supported on, and secured to the pan member;
   (d) a two stage bypass motor disposed atop said upper casing;
   (e) at least one baffle shrouding said cleaning air inlet;
   (f) at least two fluid collector rings mounted above the baffle which together provide a circuitous path for the cleaning air;
   (g) at least one of said fluid collector rings having a frusta-conical shape with a concave surface thereof oriented in a first direction, with another of said rings being a conical plate having a concave surface oriented in a direction opposite said first direction;
   (h) a replaceable air filter through which the cleaning air must pass; and
   (i) an exit port through which the cleaning air enters the environment after passing through the filter.

* * * * *